United States Patent [19]

Soni et al.

[11] Patent Number: 4,743,321

[45] Date of Patent: May 10, 1988

[54] DEVICES COMPRISING PTC CONDUCTIVE POLYMERS

[75] Inventors: Pravin L. Soni, Union City; Peter H. Van Konynenburg, Palo Alto; Mark Wartenberg, San Jose; Randolph W. Chan, Sunnyvale; Stephen M. Jacobs, Cupertino, all of Calif.

[73] Assignee: Raychem Corporation, Menlo Park, Calif.

[21] Appl. No.: 784,288

[22] Filed: Oct. 4, 1985

[51] Int. Cl.[4] .......................................... B32B 31/26
[52] U.S. Cl. ..................................... 156/85; 156/86; 174/DIG. 8; 219/200; 219/535; 219/541; 219/547; 219/548; 219/549; 338/212; 338/214
[58] Field of Search .......................... 156/84, 85, 86; 219/200, 505, 535, 541, 547, 548, 549; 174/DIG. 8; 338/212, 214

[56] References Cited

U.S. PATENT DOCUMENTS

| | | | |
|---|---|---|---|
| 3,861,972 | 1/1975 | Glover et al. | 156/86 |
| 3,971,883 | 7/1976 | Meeks et al. | 338/214 |
| 4,017,715 | 4/1977 | Whitney et al. | 219/548 |
| 4,223,209 | 9/1980 | Diaz | 338/212 |
| 4,388,607 | 6/1983 | Toy et al. | 219/549 |
| 4,400,614 | 8/1983 | Sopory | 219/549 |
| 4,421,582 | 12/1983 | Horsma et al. | 156/86 |
| 4,445,026 | 4/1984 | Walker | 219/548 |
| 4,514,620 | 4/1985 | Cheng et al. | 219/549 |
| 4,631,098 | 12/1986 | Pithouse et al. | 156/86 |

Primary Examiner—Caleb Weston
Attorney, Agent, or Firm—Timothy H. P. Richardson; Herbert Burkard

[57] ABSTRACT

The resistivity/temperature characteristics of PTC conductive polymers which have little or no cross-linking can be modified by stretching. The rate at which resistivity rises with temperature is increased, and the peak resistivity is decreased; however, the decrease in peak resistivity is substantially smaller than that observed with PTC conductive polymers having a high degree of cross-linking. Therefore, heat-recoverable electrical devices, particularly for covering telephone and other cable splices, comprise (a) a layer of a PTC conductive polymer which has little or no cross-linking, (2) an adjacent heat-recoverable layer of a PTC or ZTC conductive polymer which has a relatively high level of cross-linking, and (3) electrodes which can be connected to a power supply so that current passes through the layers and causes recovery of the device; preferably an uncrosslinked PTC layer is sandwiched between two cross-linked ZTC layers. Non-recoverable devices, e.g. heaters, can have valuable characteristics when they comprise PTC conductive polymer elements which have been given a relatively low degree of orientation by stretching.

18 Claims, 3 Drawing Sheets

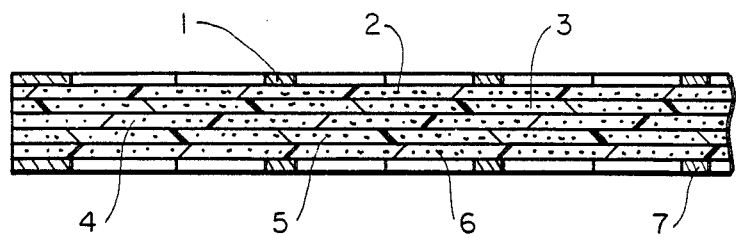
FIG_1
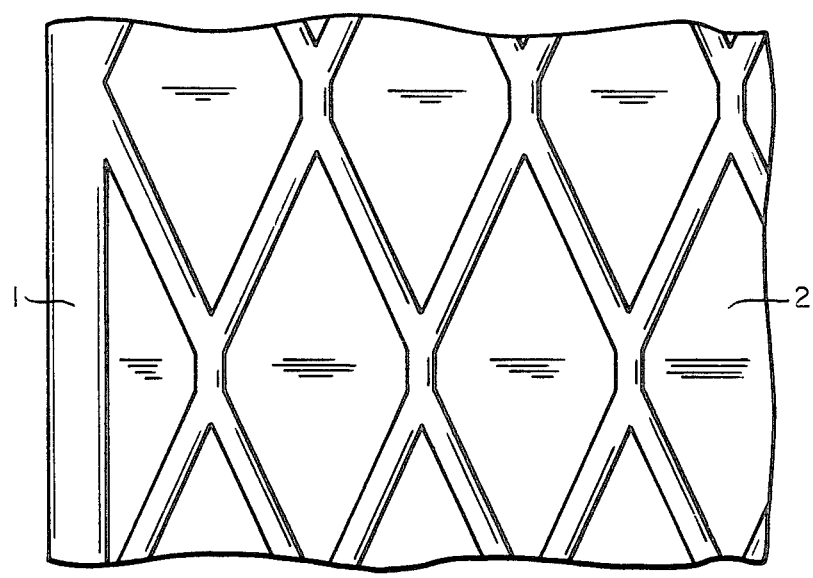
FIG_2
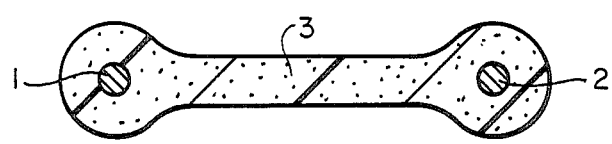
FIG_3

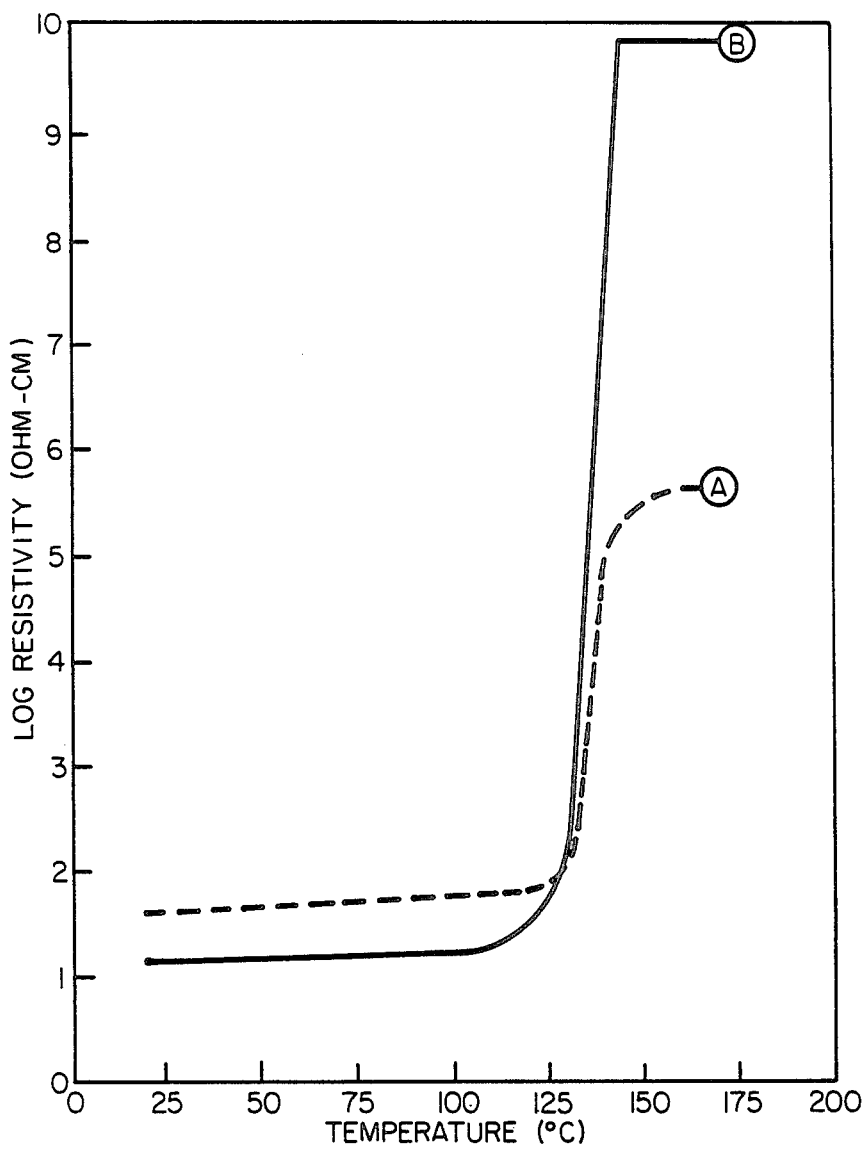
FIG_4

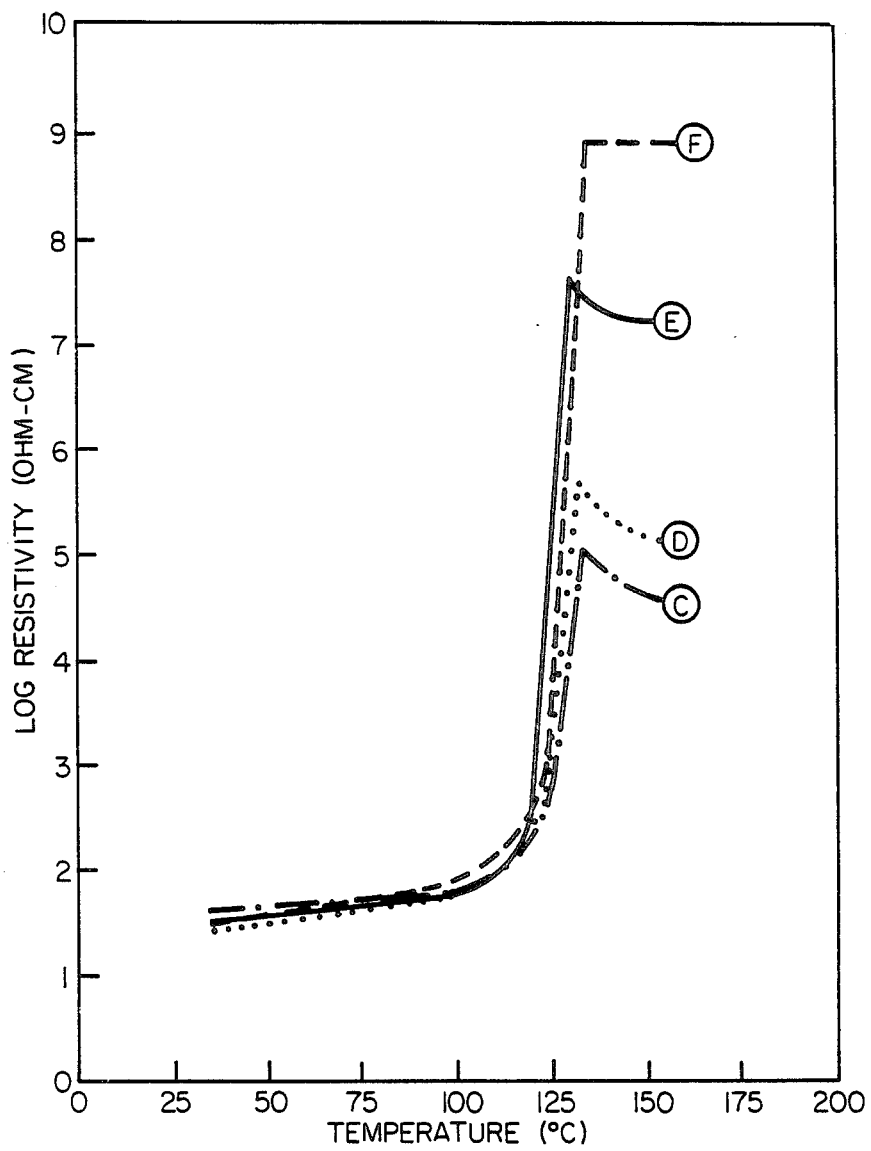
FIG_5

DEVICES COMPRISING PTC CONDUCTIVE POLYMERS

BACKGROUND OF THE INVENTION

1. Field of the Invention

This invention relates to electrical devices comprising PTC conductive polymer compositions.

2. Introduction to the Invention

Conductive polymers are well known. They comprise a particulate conductive filler which is dispersed in, or otherwise held together by, an organic polymer. They can be used in circuits in which current passes through them, eg. in heaters and circuit protection devices, and in such use they may exhibit what is known as PTC (positive temperature coefficient) or ZTC (zero temperature coefficient) behavior. The term "PTC behavior" is usually used in the art, and is so used in this specification, to denote a composition which, in the operating temperature range, has an $R_{14}$ value of at least 2.5 or an $R_{100}$ value of at least 10, preferably both, and which preferably has an $R_{30}$ value of at least 6, where $R_{14}$ is the ratio of the resistivities at the end and the beginning of the 14° C. temperature range showing the greatest increase in resistivity, $R_{100}$ is the ratio of the resistivities at the end and the beginning of the 100° C. temperature range showing the greatest increase in resistivity, and $R_{30}$ is the ratio of the resistivities at the end and the beginning of the 30° C. temperature range showing the greatest increase in resistivity. The term "ZTC behavior" is usually used in the art, and is so used in this specification, to denote a composition which does not show PTC behavior in the operating temperature range; thus the term is used to include (a) compositions which show no substantial change in resistivity over the operating temperature range (eg. from room temperature to 100° C.), (b) compositions which show substantial increases in resistivity over the operating temperature range but still do not have $R_{14}$, $R_{30}$ or $R_{100}$ values as specified above, (c) compositions which show substantial decreases in resistivity over the operating temperature range [often denoted NTC (negative temperature coefficient) compositions], and (d) compositions as defined in (a), (b) and (c) which exhibit PTC behavior at temperatures above the operating temperature range.

Documents describing conductive polymer compositions and devices comprising them include U.S. Pat. Nos. 2,952,761, 2,978,665, 3,243,753, 3,351,882, 3,571,777, 3,757,086, 3,793,716, 3,823,217, 3,858,144, 3,861,029, 3,950,604, 4,017,715, 4,072,848, 4,085,286, 4,117,312, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,481,498, 4,476,450, 4,502,929; 4,514,620, 4,517,449, and 4,534,889; J. Applied Polymer Science 19, 813–815 (1975), Klason and Kubat; Polymer Engineering and Science 18, 649–653 (1978), Narkis et al; and commonly assigned U.S. Ser. Nos. 601,424 now abandoned, published as German OLS No. 1,634,999; 732,792 (Van Konynenburg et al), now abandoned, published as German OLS No. 2,746,602; 798,154 (Horsma et al), now abandoned, published as German OLS No. 2,821,799; 141,984 (Gotcher et al), now abandoned, published as European Application No. 38,718; 141,988 (Fouts et al), now abandoned, published as European Application No. 38,718, 141,989 (Evans), published as European Application No. 38,713, 141,991 (Fouts et al), published as European Application No. 38,714, 150,909 (Sopory), published as UK Application No. 2,076,106A, 250,491 (Jacobs et al) published as European Application No. 63,440, 274,010 (Walty et al), now abandoned, 300,709 and 423,589 (Van Konynenburg et al), published as European Application No. 74,281, 369,309 (Midgley et al), published as European Application No. 92,406, 483,633 (Wasley), 606,033 (Leary et al), published as European Application No. 119,807, 599,047 and 598,048 (Masia et al), published as European Application No. 84,304,502.2, 524,482 (Tomlinson et al), published as European Application No. 84,305,584.7, 534,913 (McKinley), now abandoned, 552,649 (Jensen et al), published as European Application No. 84,307,984.9, 573,099 (Batliwalla et al) and 904,736 (Penneck et al), published as UK Patent Nos. 1,470,502 and 1,470,503, 650,918 (Batliwalla et al, 650,920 (Batliwalla et al,), 663,014 (Batliwalla et al,), 735,408 (Batliwalla et al,), 650,919 (Batliwalla et al,), 650,921 (Kheder,), 711,790 (Carlomagno,), 667,799 (Frank,), 711,908 (Ratell,), 687,120, (Leary et al,), 691,291 (Hauptly, et al,), 711,907 (Ratell,), 711,909 (Deep et al,), 720,118 (Soni et al,), 711,710 (Bliven,), 711,910 (Au et al,), 716,780 (Sandberg,), 735,409 (Batliwalla et al,), 741,657 (Morrow et al,), 744,170 (Lahlough et al,), and 764,894 (Batliwalla et al,). The disclosure of each of the patents, publications and applications referred to above is incorporated herein by reference.

Devices of particular interest are heat-recoverable articles which comprise conductive polymer elements and which can be recovered by passing current through the conductive polymer, thus generating the heat needed to cause recovery; preferably the conductive polymer comprises a PTC conductive polymer element which controls the heating process so that overheating cannot take place during or after recovery. Such articles can be used to provide an environmental barrier around a splice in a telephone cable or other substrate. Reference may be made for example to U.S. Pat. Nos. 4,223,209, 4,330,703, 4,421,582, and British Pat. No. 1,265,194, the disclosures of which are incorporated herein by reference. As is well known in the art, a polymeric article can be rendered heat-recoverable by cross-linking it, deforming the cross-linked article at a temperature above its melting point, and cooling the article in the deformed state (see for example U.S. Pat. Nos. 3,086,242 2,027,962, 3,086,242, 3,253,618, 3,253,619, 3,379,218, 3,455,336 and 3,770,556, the disclosures of which are incorporated herein by reference). A limiting factor in the development of electrically powered recoverable articles is the fact that when a cross-linked PTC conductive polymer is stretched, the increase in resistivity around the switching temperature ($T_s$) decreases; the greater the stretching, the less the resistivity increases. For example, in many cases, if a cross-linked PTC conductive polymer is stretched more than 2X (ie. to twice its original dimension), as would be desirable, for example, in making heat-recoverable articles as disclosed in U.S. Pat. No. 4,421,582, the conductive polymer ceases to exhibit PTC behavior or at any rate ceases to show an increase in resistivity which provides adequate assurance against runaway heating U.S. Pat. Nos. 4,177,446 and 4,223,209 seek to overcome this drawback by means of an apertured PTC conductive polymer heater which can undergo dimensional change by changes in the shape of the apertures and which is attached to a non-conductive heat-recoverable article. This is a useful approach, but it suffers from the disadvantage that the heater itself does not provide a barrier against moisture etc. after recovery.

SUMMARY OF THE INVENTION

We have discovered that stretching of PTC conductive polymers which have little or no cross-linking does not produce the same serious adverse effects on resistivity/temperature characteristics as it does on cross-linked PTC conductive polymers. In particular, although there is a reduction in peak resistivity, the reduction is substantially less than it is in conductive polymers having a relatively high level of cross-linking. Furthermore, the rate at which resistivity increases with temperature can be increased by stretching.

We have made use of these discoveries to develop improved heat-recoverable devices which are particularly useful for covering splices in telephone and other cables, as well as other substrates, and also improved devices which are not heat-recoverable, in particular heaters and circuit protection devices.

In its first aspect, this invention provides a heat-recoverable electrical device which comprises (1) a first component which is heat-recoverable and which is preferably composed of a cross-linked conductive polymer;

(2) a second component which is composed of a conductive polymer exhibiting PTC behavior; and (3) electrodes which can be connected to a source of electrical power;

the electrodes and the first and second components being such that, when the electrodes are connected to a suitable source of electrical power, current passes through the first and second components so that the device recovers; and the second component having at least one of the following characteristics (a) it is substantially free from cross-linking;

(b) it has been cross-linked by irradiation to a dosage of less than 6, preferably less than 3 Mrads;

(c) when the first component has been cross-linked by irradiation, the second component has been cross-linked by irradiation to a dosage which is at least 2 Mrads below, preferably at least 5 Mrads below the dosage used to cross-link the first component; and (d) it has an $M_{100}$ value at a temperature 15° C. above its crystalline melting temperature which is at most 0.65 times the $M_{100}$ value, at the same temperature, of a sample of the same material, having a thickness of 40 mils, which has been irradiated on one surface with a 2.7 MeV electron beam to a dosage of 10 Mrads.

Through use of the present invention it is possible to make heat-recoverable devices which have surprisingly high recovery ratios, eg. at least two or three and even higher.

In its second aspect, this invention provides a process for covering a substrate wherein a device as defined above is placed adjacent a substrate and is then connected to a suitable power supply so that it recovers towards the substrate.

In its third aspect, this invention provides an electrical device which is not heat-recoverable and which comprises (1) a melt-extruded PTC element which is composed of a conductive polymer exhibiting PTC behavior and which has been oriented by stretching, and (2) electrodes which can be connected to a source of electrical power to cause current to pass through the PTC element.

In its fourth aspect the present invention provides a method of making a heat recoverable electrical device which comprises (1) irradiating at least one major surface of a laminar conductive polymer component having a thickness of at least 100 mils with an electrode beam having an energy of at most 300 KeV; and (2) subjecting the irradiated component to a treatment which renders it heat-recoverable.

In its fifth aspect the present invention provides a method of making a heat recoverable electrical device which comprises (1) irradiating a laminar conductive polymer component which contains at least one compound whose presence affects the cross-linking density produced in the conductive polymer and whose concentration varies through the thickness of the laminar component, under conditions such that the conductive polymer is cross-linked to a varying extent through the thickness of the laminar component; and (2) subjecting the irradiated laminar component to a treatment which renders it heat-recoverable.

In one preferred embodiment, a radiation cross-linking agent is included in the portions of the component adjacent the major surfaces of the component, and the intermediate portion contains neither pro-rad nor inhibitor. In another preferred embodiment, the intermediate portion of the device contains inhibitor and the portions adjacent the major surfaces contain neither pro-rad nor inhibitor. In the method according to the fifth aspect of the invention, a beam dose of, 5 to 25, eg. about 10, Mrads can for example be used.

Methods according to both the fourth and fifth aspect of the invention advantageously result in an arrangement in which the central portion of the device is less cross-linked than those portions of the device adjacent its major surfaces.

BRIEF DESCRIPTION OF THE DRAWING

The invention is illustrated in the accompanying drawing, in which

FIG. 1 is a cross-sectional view of a part of a heat-shrinkable laminar device of the present invention;

FIG. 2 is a plan view of the device shown in FIG. 1;

FIG. 3 is a cross-sectional view of a self-limiting strip heater of the present invention;

FIG. 4 shows the resistivity/temperature relationship for a conductive polymer composition before and after stretching; and FIG. 5 shows the resistivity/temperature relationship for a stretched conductive polymer composition, cross-linked by a number of different electron beam dosages.

DETAILED DESCRIPTION OF THE INVENTION

In many devices, and in particular in devices which comprise laminar conductive polymer components which lie between generally laminar electrodes (including apertured electrodes), it is preferable for the second component (composed of PTC conductive polymer and having little or no cross-linking) to be separated from the electrodes by a layer of another conductive polymer, in order to ensure that, in operation of the device, any hot zone which forms is separated from the electrode. This is especially true of heat-recoverable devices, where the change in shape increases the likelihood that formation of a hot zone near an electrode will cause arcing or an electrical short. Therefore, the heat-recoverable devices of the invention preferably comprise a third component which is preferably composed of a cross-linked conductive polymer and which is heat recoverable, so that the second component (composed of PTC conductive polymer and having little or no cross-linking) is sandwiched between two heat-recoverable components.

The heat-recoverable devices of the invention can be of any configuration, but they are preferably laminar heat-shrinkable devices comprising continuous (ie. aperture-free) conductive polymer layers, and this aspect of the invention will chiefly be described by reference to such devices. The term "laminar" is used to include any device in which the conductive polymer components have two dimensions which are much larger than the third dimension; thus a laminar device can be planar, but can also be, for example, cylindrical. The laminar devices of the invention are preferably prepared in the form of flexible planar articles which can be used, for example, by wrapping them around a substrate to be covered, securing the wrapped ends together, and powering the article so that it shrinks towards the substrate. The shrunken article can contact the substrate directly or indirectly, for example through an intermediate layer which can be a heat-responsive layer eg. of an adhesive or a mastic.

In the heat-recoverable devices, the conductive polymer components and the electrodes must of course be chosen so that the desired recovery can take place when the device is powered. Similarly, to the extent that the different parts of the device are secured together before the heat-recoverable layers are rendered heat-recoverable, they must be selected so that they will permit the desired degree of heat-recoverability to be imparted. Preferred electrodes are those which can change shape to accommodate the recovery (and, if need be, expansion), particularly apertured electrodes which can change shape upon recovery through a change in the shape of the apertures, for example expanded metal mesh electrodes, pierced metal foil electrodes, and woven metal electrodes. However, rigid electrodes can be used provided that recovery takes place substantially at right angles to any long dimension of the electrode. The conductive polymers must also be selected with care in order to ensure that the device will reach the recovery temperature of the heat-recoverable component(s), and will maintain such a temperature while sufficient recovery takes place. Recovery of heat-recoverable polymeric articles begins at about the crystalline melting point of the polymer, but it is desirable to attain somewhat higher temperatures, eg. at least 5° C. higher, in order to ensure sufficient recovery in a reasonable time (say, less than five minutes). The switching temperature ($T_s$) of a PTC conductive polymer is generally a little below the crystalline melting point, though a suitably designed device containing a PTC conductive polymer can have a $T_s$ which is above the inherent $T_s$ of the conductive polymer, as explained for example in U.S. Pat. Nos. 4,017,715 and 4,177,376, the disclosures of which are incorporated herein by reference. In view of these facts, although it is possible to make devices of the invention in which the sole heat-recoverable components are composed of the same conductive polymer as the PTC component (though substantially more cross-linked) or which are based on the same crystalline polymer but contain a different conductive filler, the recovery ratios which can be achieved in this way are limited. It is preferred that at least one of the heat-recoverable components comprises a first crystalline polymer and that the PTC component comprises a second crystalline polymer whose crystalline melting point is above, preferably at least 5° C. above, eg. 5 to 20° C. above, the crystalline melting point of the first crystalline polymer. In this way, the PTC component will control at a temperature high enough to ensure recovery of the heat-recoverable components. As noted above, orientation of a cross-linked PTC conductive polymer ( such as takes place when such a conductive polymer is rendered heat-recoverable) reduces the size of the increase in resistivity which takes place on heating, and especially at higher expansion ratios of 2X or more, can result in a heat-recoverable member which no longer exhibits PTC behavior but rather exhibits ZTC behavior. The invention includes devices comprising heat-recoverable components which exhibit PTC behavior, even though stretched, and heat-recoverable components which exhibit ZTC behavior and have been obtained by stretching components which exhibit PTC behavior. However, there is a danger that such components, as they recover, will once again exhibit PTC behavior which will cause them to inhibit the flow of a current in a way which is not desired, particularly if they comprise a crystalline polymer whose melting point is lower than that of the crystalline polymer in the PTC component. It is preferred, therefore, that at least one of the heat-recoverable components should be composed of a conductive polymer which exhibits ZTC behavior in the unstretched state.

Suitable conductive polymers are known in the art or described in the patent applications incorporated by reference herein, and those skilled in the art will have no difficulty, having regard to their own knowledge and the disclosure herein, in determining suitable conductive polymers for carrying out the invention. Particularly suitable are the compositions disclosed in application Ser. No. 720,118 (Soni et al,) which is incorporated herein by reference. Those compositions comprise a melt-processable polymer having a weight average molecular weight, Mw, of at least 150,000 and exhibit excellent physical properties, even at elevated temperatures and even when having little or no cross-linking, making them particularly suitable for use in the second component. Polyethylene having a molecular weight Mw, of at least 150,000, more preferably at least 200,000 is a particularly preferred polymer. Polyethylene having a molecular weight, Mw, in the range 150,000 to 400,000 is especially preferred. Other particularly preferred conductive polymer compositions are those disclosed in European patent application, Publication No. 0153199 (Rosenzweig) and U.S. application Ser. No. 720,117 (Rosenzweig et al,), the disclosure of each of which is incorporated herein by reference. Those compositions include polymers, particularly sintered polymers having a molecular weight, Mw, greater than 3 million.

It is important that the conductive polymer of the second component is free from cross-linking or has a relatively low level of cross-linking such that the component provides the necessary temperature control even after stretching. The higher the expansion ratio used to render the device heat-recoverable, the lower the permissible degree of cross-linking. The invention is particularly useful when the draw ratio used to effect expansion is above 3X, more preferably above 4X, where the draw ratio is the ratio of the length of the sample before and after stretching. When the device is prepared by laminating the second component to other components which have already been cross-linked, the second component is preferably free from cross-linking. When the other components are obtained by selective radiation cross-linking of a single layer of conductive polymer, and/or by selective radiation cross-linking of a laminate of sheets of different conductive polymers, then some cross-linking of the second component will take place. However, it is preferred that the dosage absorbed by at least part of the second component should be (a) less than 6 Mrads, preferably less than 3 Mrads, and/or (b) at least 2 Mrads less, preferably at least 5 Mrads less, than the maximum dosage absorbed by any other part of the other components. The cross-linking density produced by a particular radiation dose depends upon the polymer and on the quantity (if any) of radiation cross-linking agents or inhibitors in the conductive polymer; and the radiation dose absorbed depends upon the depth below the irradiated surface and the energy of the radiation. The cross-linking density produced by irradiating a sheet composed of a conductive polymer can, therefore, be controlled in the desired way by irradiating the sheet with low energy radiation on each surface thereof (this method being suitable for use when the conductive polymer sheet is of uniform composition throughout and when the conductive polymer sheet comprises two or more layers of different composition) and/or by making use of a conductive polymer sheet which comprises different layers, at least some of which layers contain a radiation cross-linking agent or a radiation cross-linking inhibitor.

One measure of the extent to which a conductive polymer has been cross-linked is its $M_{100}$ value above its melting point. The second component has an $M_{100}$ value at a temperature 15° C. above its crystalline melting temperature which is at most 0.65 times, particularly at most 0.5 times, the $M_{100}$ value at the same temperature of a sample of the same material having a thickness of 40 mils, which has been irradiated on one surface with a 2.7 MeV electron beam to a dosage of 10 Mrads. The $M_{100}$ values referred to herein are determined by a dynamic modulus test carried out at a temperature 15° C. above the crystalline melting temperature of the material. In this test the stress required to elongate a sample of the component by 100% (or to rupture if elongation to 100% cannot be achieved) is measured. Marks separated by 1 inch (2.54 cm) are placed on the center section of a dogbone-shaped sample (length 4 inches, thickness 40 mils, width of central region 0.125 inch, gauge length used in testing 1.5 inch), and the sample is stretched at a temperature 15° C. above the crystalline melting temperature of the material at a rate of 2 inch per minute in an Instron hot box. The load at 100% elongation is measured, and the $M_{100}$ value is then calculated from the expression.

$$M_{100} = \frac{\text{load} \times 100 \div \text{percent elongation}}{\text{Initial cross-sectional area}}$$

The devices of the invention which are not heat-shrinkable make use of the fact that when a PTC conductive polymer is stretched, there is an increase in the rate at which resistivity increases with temperature. Although the total increase in resistivity around $T_s$ gets smaller, there are many PTC conductive polymers, particularly those which are not cross-linked, which retain a sufficient total increase in resistivity, even after substantial stretching, to be wholly satisfactory for many purposes. With such PTC conductive polymers, the use of stretching to change the shape of the resistivity/temperature curve can be very valuable. Stretching by at least 1.2X, preferably at least 1.5X, is generally needed to show a useful change and stretching by more than about 4.0X is not recommended in this aspect of the invention. The conductive polymer preferably has little or no cross-linking, as previously described for the second component of the heat-recoverable devices.

The devices of the invention normally be surrounded by a layer of electrical insulation, the insulation being heat-recoverable when the device is heat-recoverable.

Referring now to the drawing, FIGS. 1 and 2 show a heat-shrinkable laminated device which comprises a first expanded metal electrode 1, a continuous, heat-recoverable layer 2 of a cross-linked conductive polymer exhibiting ZTC behavior, a continuous heat-recoverable layer 3 of a cross-linked conductive polymer, a continuous layer 4 of an uncrosslinked conductive polymer exhibiting PTC behavior, a continuous heat-recoverable layer 5 of a cross-linked conductive polymer, a continuous heat-recoverable layer 6 of a cross-linked conductive polymer exhibiting ZTC behavior, and a second expanded metal electrode 7.

FIG. 3 shows a self-regulating strip heater of constant cross-section along its length and comprising stranded wire electrodes 1 and 2 which are embedded in an elongate strip 3 of oriented PTC conductive polymer prepared by melt-extruding the conductive polymer around the electrodes while simultaneously drawing the extruded conductive polymer so as to orient it. As an alternative, the conductive polymer could be stretched transversely while extruding it in order to orient it.

Not shown in FIGS. 1-3, but normally present, is a layer of electrical insulation surrounding the electrically active parts of the device.

FIG. 4 is a graph showing the resistivity-temperature relationship for an uncrosslinked conductive polymer composition, before and after stretching. The stretched sample is illustrated by curve A, and the unstretched sample by curve B. The stretched sample A has a significantly lower peak resistivity and autotherm height than the unstretched sample B. Also the rate at which the resistivity increases, in the vicinity of the autotherming (or switch) temperature is much greater for the stretched sample than the unstretched sample. This is particularly apparent at the onset of autotherming.

FIG. 5 is a graph showing the resistivity-temperature relationship for a stretched conductive polymer composition, cross-linked by a number of different beam dosages. The composition is the same in each case. The energy of the electron beam is the same in each case. Curves C, D, E and F represent irradiation to dosages of 8, 6, 2 and 0 Mrads respectively. The peak resistivity and autotherming height (increase in resistivity at $T_s$) increases significantly as the beam dose decreases. (The peak resistivity for the non-irradiated sample cannot be ascertained from the curve since it extends beyond the scale of the measuring apparatus as is apparent by the flat top of the curve).

The invention is illustrated with reference to the following Example, which describes the method of manufacture of a device according to the invention. The method could be used, for example to make the device illustrated in FIGS. 1 and 2, wherein layers 3, 4 and 5 are provided by a single PTC layer.

EXAMPLE

First the compositions of the components of the device were prepared as follows.

(A) Insulation composition (not shown in FIGS. 1 and 2)
97.0 wt% DEFD 1225 (linear very low density polyethylene) supplied by Union Carbide
2.0 wt% Statex MT (carbon black, supplied by Columbian Chemical Corp.)
1.0 wt% antioxidant (B) Electrode mesh (member 1 in FIGS. 1 and 2)
10-AL-10 575, (supplied by Delker Corporation)
Mesh has a thickness of 10 mils. Also each strand of mesh has a width of 10 mils. There are 12 slits per inch.

(C) ZTC composition (for members 2 and 6 in FIGS. 1 and 2)
20.0 wt% Ketjenblack 300J (carbon black supplied by Akzo Chemie)
79.0 wt% DPD 6169 (ethylene ethyl acrylate supplied by Union Carbide) 1.0 wt% antioxidant (D) PTC composition (for members 3, 4 and 5 in FIGS. 1 & 2)
41.0 wt% Statex GH (carbon black, supplied by Columbian Chemical Corp.)
58.0 wt% Marlex HXM 50100 (high molecular weight, high density polyethylene supplied by Phillips)
1.0 wt% antioxidant The antioxidant used was an oligomer of 4,4-thio bis (3-methyl-6-t-butyl phenol) with an average degree of polymerization of 3-4, as described in U.S. Pat. No. 3,986,981.

All the polymeric compositions were prepared using a Banbury compounder and then a pelletizing extruder.

Then the polymeric compositions were extruded into sheets (using a 2.5 inch screw diameter extruder having a sheet die width of 21 inches), the insulation layer being extruded at 300°–350° F., the ZTC layer at 320–350° F., and the PTC layer at 380°–450° F. The PTC composition was extruded into sheets having a thickness of 40 mils and each of the ZTC and insulation sheets having a thickness of 35 mils. Two laminates were then prepared, each comprisng a sheet of the insulation composition, the electrode mesh, and a sheet of the ZTC composition, the electrode mesh being sandwiched between the polymer compositions. The lamination was carried out at 400° F. using a nip roller operating at 10 feet per minute and exerting a force of 25 psi. The laminates were chilled at 32° F. The prepared laminates were irradiated from one side with a 2.7 MeV electron beam to a dose of 8 Mrads. The sheet of PTC composition was irradiated, from both sides, with a 175 KeV electron beam to a dose of 20 Mrads. A second lamination step was then carried out to laminate the irradiated PTC sheet between the two irradiated, previously prepared insulation/electrode/ZTC laminates. The second lamination step was carried out at 450° F. using a nip roller operating at 3.5 feet per minute and exerting a force of 15 psi. The final laminate was chilled at 32° F. The PTC layer was preheated to 100° C. for the lamination process. Finally the prepared laminate was expanded to render it heat-recoverable. Expansion was effected using an expander, the laminate being fed into the expander at 5 feet per minute and drawn from the expander at 15 feet per minute. The laminate was preheated to 230° F. for the expansion process.

We claim:

1. A heat-recoverable electrical device which comprises
   (1) a first component which is composed of a cross-linked conductive polymer and which is heat-recoverable;
   (2) a second component which is composed of a conductive polymer exhibiting PTC behavior; and
   (3) electrodes which can be connected to a source of electrical power;
   the electrodes and the first and second components being such that, when the electrodes are connected to a suitable source of electrical power, current passes through the first and second components so that the device recovers; and the second component having at least one of the following characteristics
   (a) it is substantially free from cross-linking;
   (b) it has been cross-linked by irradiation to a dosage of less than 6 Mrads;
   (c) when the first component has been cross-linked by irradiation, the second component has been cross-linked by irradiation to a dosage which is at least 2 Mrads below the dosage used to cross-link the first component; and
   (d) it has an $M_{100}$ value at a temperature 15° C. above its crystalline melting temperature which is at most 0.65 times the $M_{100}$ value, at the same temperature, of a sample of the same material, having a thickness of 40 mils, which has been irradiated on one surface with a 2.7 MeV electron beam to a dosage of 10 Mrads.

2. A device according to claim 1 which further comprises
   (4) a third component which is composed of a cross-linked conductive polymer and which is heat-recoverable,
   and wherein the second component lies between the first and third components.

3. A device according to claim 2 which is heat-shrinkable and wherein the first, second and third components are in the form of continuous laminar sheets.

4. A device according to claim 3 which has been prepared by a process which comprises
   (A) laminating together, in order, (a) a sheet composed of a cross-linked conductive polymer, (2) a sheet composed of a substantially uncrosslinked conductive polymer which exhibits PTC behavior, and (3) a sheet composed of a cross-linked conductive polymer; and
   (B) subjecting the laminate from step (A) to a treatment which renders it heat-shrinkable.

5. A device according to claim 4 wherein the conductive polymers in the first, second and third sheets are the same.

6. A device according to claim 3 which has been prepared by a process which comprises
   (A) laminating together, in order, (1) a sheet composed of a cross-linked conductive polymer which exhibits ZTC behavior, (2) a sheet composed of a cross-linked conductive polymer which exhibits PTC behavior, (3) a sheet composed of a substantially uncrosslinked conductive polymer which exhibits PTC behavior, (4) a sheet composed of a cross-linked conductive polymer which exhibits PTC behavior, and (5) a sheet composed of a cross-linked conductive polymer which exhibits ZTC behavior; and (B) subjecting the laminate from step (A) to a treatment which renders it heat-shrinkable.

7. A device according to claim 6 wherein sheets (1) and (5) are composed of a conductive polymer comprising a first crystalline polymer and sheets (2), (3) and (4) are composed of a conductive polymer comprising a second crystalline polymer having a melting point higher than the first crystalline polymer.

8. A device according to claim 7 wherein the second polymer has a melting point at least 5° C. higher than the first polymer.

9. A device according to claim 3 which has been prepared by a process which comprises (A) irradiating a sheet composed of conductive polymer under conditions such that, after irradiation, the sheet comprises an inner layer which is composed of a conductive polymer exhibiting PTC behavior and which has a relatively low degree of cross-linking, and two outer layers which have a relatively high degree of cross-linking; and (B) subjecting the irradiated sheet from step(A) to a treatment which renders it heat-shrinkable.

10. A device according to claim 9 wherein the sheet is of uniform composition prior to the irradiation and wherein the sheet is irradiated with low energy radiation on each surface thereof.

11. A device according to claim 9 wherein prior to the irradiation, the susceptibility of the conductive polymer to cross-linking by irradiation is lower at the center of the sheet than it is at the surfaces of the sheet.

12. A device according to claim 11 wherein the sheet comprises, prior to irradiation, a first layer composed of a conductive polymer which contains a radiation cross-linking agent, a second layer composed of a conductive layer which comprises a radiation cross-linking inhibitor, and a third layer composed of a conductive polymer which contains a radiation cross-linking agent, the second layer lying between the first and third layers.

13. A device according to claim 3 which has a recovery ratio of at least 2.

14. A device according to claim 3 which has a recovery ratio of at least 3.

15. A device according to claim 3 wherein the second component is composed of a conductive polymer which comprises a polyethylene having a molecular weight of 150,000 to 400,000.

16. A method of covering a substrate which comprises (A) placing around the substrate a heat-recoverable electrical device which comprises
  (1) a first component which is composed of a cross-linked conductive polymer and which is heat-recoverable;
  (2) a second component which is composed of a conductive polymer exhibiting PTC behavior; and
  (3) electrodes which can be connected to a source of electrical power;
the electrodes and the first and second components being such that, when the electrodes are connected to a suitable source of electrical power, current passes through the first and second components so that the device recovers; and the second component having at least one of the following characteristics
  (a) it is substantially free from cross-linking;
  (b) it has been cross-linked by irradiation to a dosage of less than 6 Mrads;
  (c) when the first component has been cross-linked by irradiation, the second component has been cross-linked by irradiation to a dosage which is at least 2 Mrads below the dosage used to cross-link the first component; and
  (d) it has an $M_{100}$ value at a temperature 15° C. above its cystalline melting temperature which is at most 0.65 times the $M_{100}$ value, at the same temperature, of a sample of the same material, having a thickness of 40 mils, which has been irradiated on one surface with a 2.7 MeV electron beam to a dosage of 10 Mrads, and (B) connecting the electrodes to a power supply so that the device recovers towards the substrate.

17. A method according to claim 16 wherein the second component has been cross-linked by irradiation to a dosage of less than 3 Mrads.

18. A method according to claim 16 wherein when the first component has been cross-linked by irradiation, the second component has been cross-linked by irradiation to a dosage which is at least 5 Mrads below the dosage used to cross-link the first component.

* * * * *